US010619035B2

(12) United States Patent
Vittorias et al.

(10) Patent No.: US 10,619,035 B2
(45) Date of Patent: Apr. 14, 2020

(54) POLYETHYLENE COMPOSITION FOR FILMS

(71) Applicant: Basell Polyolefine GmbH, Wesseling (DE)

(72) Inventors: Iakovos Vittorias, Mainz (DE); Gerhardus Meier, Frankfurt (DE); Ulf Schüller, Weiterstadt (DE); Andreas Maus, Frankfurt (DE); Jens Wiesecke, Zwingenberg (DE); Harilaos Mavridis, Lebanon, OH (US)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/739,652

(22) PCT Filed: Jun. 6, 2016

(86) PCT No.: PCT/EP2016/062746
§ 371 (c)(1),
(2) Date: Dec. 22, 2017

(87) PCT Pub. No.: WO2016/206957
PCT Pub. Date: Dec. 29, 2016

(65) Prior Publication Data
US 2018/0179367 A1 Jun. 28, 2018

Related U.S. Application Data

(60) Provisional application No. 62/185,238, filed on Jun. 26, 2015.

(51) Int. Cl.
*C08L 23/08* (2006.01)
*C08L 23/06* (2006.01)
*B32B 27/32* (2006.01)
*B32B 27/08* (2006.01)

(52) U.S. Cl.
CPC .............. *C08L 23/06* (2013.01); *B32B 27/08* (2013.01); *B32B 27/32* (2013.01); *C08L 23/0815* (2013.01); *B32B 2270/00* (2013.01); *B32B 2307/558* (2013.01); *B32B 2307/72* (2013.01); *C08L 2203/16* (2013.01); *C08L 2205/025* (2013.01); *C08L 2308/00* (2013.01); *C08L 2314/02* (2013.01)

(58) Field of Classification Search
CPC ...... C08L 23/06; C08L 23/08; C08L 23/0815; C08L 2314/02; C08L 2203/16; C08L 2205/025; C08L 2308/00; B32B 27/08; B32B 27/32; B32B 2307/72
See application file for complete search history.

(56) References Cited

U.S. PATENT DOCUMENTS

| 6,489,427 | B1 | 12/2002 | Clutton et al. |
| 7,714,072 | B2 | 5/2010 | Michie, Jr. et al. |
| 7,897,710 | B2 | 3/2011 | Amos et al. |
| 2007/0043177 | A1 | 2/2007 | Michie et al. |
| 2013/0165590 | A1* | 6/2013 | McLeod ................. C08L 23/06 525/240 |
| 2014/0243475 | A1 | 8/2014 | Mavridis et al. |
| 2015/0267010 | A1* | 9/2015 | Vittorias ............ C08L 23/0815 526/226 |
| 2015/0274866 | A1* | 10/2015 | Vittorias ............ C08L 23/0815 526/185 |

FOREIGN PATENT DOCUMENTS

| EP | 1951765 A1 | 8/2008 |
| EP | 2256160 A2 | 12/2010 |
| EP | 2738211 A1 | 6/2014 |
| JP | 2007505201 A | 3/2007 |
| RU | 2161167 C2 | 12/2000 |
| WO | WO 2014/064060 A1 * | 5/2014 |
| WO | WO 2014/064062 A1 * | 5/2014 |
| WO | WO-2014134193 A1 | 9/2014 |

OTHER PUBLICATIONS

ASTM D1238-13; Aug. 2013.*
The International Search Report and Written Opinion for PCT/EP2016/062746 dated Jul. 25, 2016.

* cited by examiner

*Primary Examiner* — Roberto Rabago

(57) ABSTRACT

A polyethylene composition having the following features:
1) density from 0.945 to 0.958 g/cm$^3$, determined according to ISO 1183 at 23° C.;
2) ratio MIF/MIP from 20 to 43;
3) MIF from 4.0 to less than 8.5 g/10 min.;
4) HMWcopo index from 3.5 to 20; and
5) long-chain branching index, LCBI, equal to or lower than 0.82. The polyethylene composition can be used to produce blown films.

13 Claims, 1 Drawing Sheet

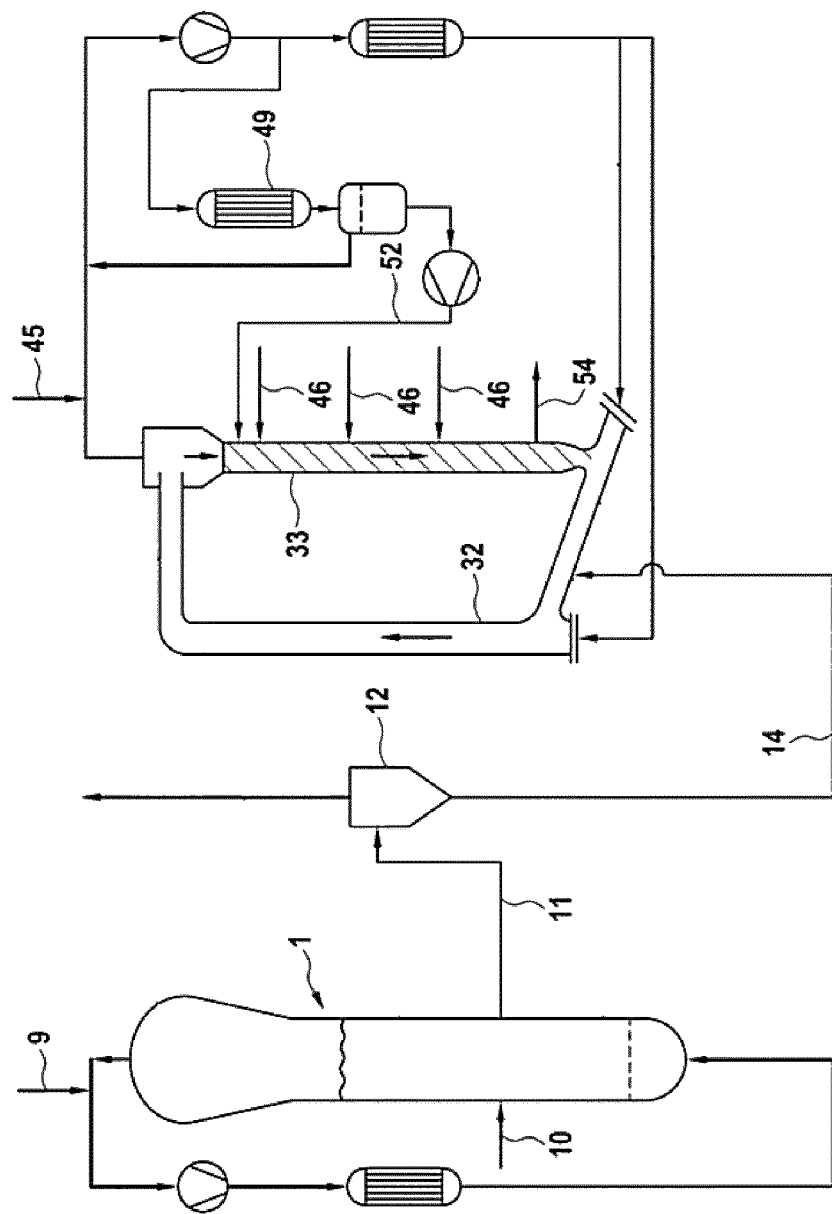

POLYETHYLENE COMPOSITION FOR FILMS

This application is the U.S. National Phase of PCT International Application PCT/EP2016/062746, filed Jun. 6, 2016, claiming benefit of priority to U.S. Provisional Patent Application No. 62/185,238, filed Jun. 26, 2015, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides a polyethylene composition for preparing blown films and a multi-stage polymerization process for preparing the polyethylene composition.

BACKGROUND OF THE INVENTION

Some polyethylene materials are used for producing films by a blown film extrusion process.

However, some blown films made of polyethylene have an inadequate balance of mechanical strength as measured by Dart Drop Impact strength (DDI) and processability.

SUMMARY OF THE INVENTION

In a general embodiment, the present disclosure provides a polyethylene composition having a molecular weight and the following features:
1) density from 0.945 to 0.958 g/cm$^3$, alternatively from 0.948 to 0.955 g/cm$^3$, determined according to ISO 1183 at 23° C.;
2) ratio MIF/MIP from 20 to 43, alternatively from 25 to 40, where MIF is the melt flow index at 190° C. with a load of 21.60 kg, and MIP is the melt flow index at 190° C. with a load of 5 kg, both determined according to ISO 1133;
3) MIF from 4.0 to less than 8.5 g/10 min., alternatively from 4.5 to 8.0 g/10 min.;
4) HMWcopo index from 3.5 to 20;
5) long-chain branching index, LCBI, equal to or lower than 0.82, alternatively lower than 0.80, alternatively from 0.82 to 0.45, alternatively from 0.80 to 0.45;
wherein the HMWcopo index is determined according to the following formula:

$$\text{HMWcopo} = (\eta_{0.02} \times t_{maxDSC})/(10^5)$$

where $\eta_{0.02}$ is the complex viscosity of a melt in Pa·s, measured at a temperature of 190° C., in a parallel-plate (or plate-plate) rheometer under dynamic oscillatory shear mode with an applied angular frequency of 0.02 rad/s; $t_{maxDSC}$ is the time, in minutes, to reach the maximum value of heat flow (in mW) of crystallization (time at which the maximum crystallization rate is achieved, equivalent to the t½ crystallization half-time) at a temperature of 124° C. under quiescent conditions, measured in isothermal mode in a differential scanning calorimetry apparatus, DSC; and LCBI is the ratio of the measured mean-square radius of gyration R$_g$, measured by GPC-MALLS, to the mean-square radius of gyration for a linear PE having a molecular weight equal to the molecular weight of the polyethylene composition. In some embodiments, the molecular weight is 1,000,000 g/mol.

In some embodiments, the MIP values for the polyethylene compositions range from about 0.09 to about 0.43 g/10 min.

BRIEF DESCRIPTION OF THE DRAWINGS

The present disclosure may be better understood with reference to the following description and accompanying FIGURE where:

FIG. 1 is a drawing of a simplified process-flow diagram of two serially connected gas-phase reactors for use in ethylene polymerization processes for producing polyethylene compositions.

The various embodiments of the present disclosure are not limited to the arrangements and instrumentality shown in the FIGURE.

DETAILED DESCRIPTION OF THE INVENTION

As used herein, the expression "polyethylene composition" embraces, as alternatives, both a single ethylene polymer and an ethylene polymer composition. The ethylene polymer composition may be made from or contain two or more ethylene polymer components and called "bimodal" or "multimodal" polymer. In some embodiments, the ethylene polymer components can have different molecular weights.

In some embodiments, the polyethylene composition can be made from or contain one or more ethylene copolymers.

All the features herein defined, including features 1) to 5), are referred to the ethylene polymer or ethylene polymer composition. The addition of other components can modify one or more of the features.

As used herein, the ratio MIF/MIP provides a rheological measure of molecular weight distribution.

Another measure of the molecular weight distribution is provided by the ratio M$_{w\_MALLS}$/M$_{n\_GPC}$, where M$_{w\_MALLS}$ is the weight average molar mass measured with MALLS coupled to GPC and M$_{n\_GPC}$ is the number average molar mass, measured by GPC (Gel Permeation Chromatography).

In some embodiments, M$_{w\_MALLS}$/M$_{n\_GPC}$ values for the polyethylene composition range from 15 to 40, alternatively 17 to 37.

In some embodiments, M$_{w\_MALLS}$ values are equal to or higher than 300,000 g/mol and lower than 550,000, alternatively from 320,000 to 450,000 g/mol.

In some embodiments, the polyethylene composition has at least one of the following additional features.

z-average molecular weight Mz equal to or greater than 1,200,000 g/mol, alternatively from 1,200,000 to 3,500,000 g/mol, measured by GPC-MALLS (Gel Permeation Chromatography coupled with Multi-angle laser-light scattering); and comonomer content equal to or less than 2.5% by weight, alternatively from 0.8 to 2% by weight, with respect to the total weight of the composition.

In some embodiments, the comonomer or comonomers present in the ethylene copolymers are selected from olefins having formula CH$_2$=CHR wherein R is an alkyl radical, linear or branched, having from 1 to 10 carbon atoms.

In some embodiments, the olefins having formula CH$_2$=CHR are selected from the group consisting of propylene, butene-1, pentene-1, 4-methylpentene-1, hexene-1, octene-1 and decene-1. In some embodiments, the comonomer is hexene-1.

In some embodiments, the polyethylene composition is made from or contains:

A) 30 to 70% by weight, alternatively from 40 to 60% by weight of an ethylene homopolymer or copolymer with density equal to or greater than 0.960 g/cm$^3$ and melt flow index MIE at 190° C. with a load of 2.16 kg, according to ISO 1133, of 30 g/10 min. or higher, alternatively of 35 g/10 min. or higher; and B) 30 to 70% by weight, alternatively from 40 to 60% by weight of an ethylene copolymer having a MIE value lower than the MIE value of A), alternatively lower than 0.5 g/10 min.

In some embodiments, component A is homopolymer.

The above percent amounts are given with respect to the total weight of A)+B).

In some embodiments, MIE ranges for component A) are from 30 to 100 g/10 min., alternatively from 30 to 95 g/10 min., alternatively from 35 to 100 g/10 min., alternatively from 35 to 95 g/10 min.

In some embodiments, the polyethylene composition is processed by a film blowing process.

In some embodiments, the polyethylene composition ensures an adequate film bubble stability. In some embodiments, the film bubble coming out from an annular die is stable at high take-off speeds and shows no tendency to alter its geometry neither in axial direction nor in radial direction.

In some embodiments, the bubble has a frost line delimiting the molten material from the solidified material oscillating not more than ±2 cm in axial direction during a shock test at a maximal take-off speed.

In a general embodiment, the present disclosure relates to a blown film made from or containing the polyethylene composition. In some embodiments, the blown film can be mono- or multilayer, wherein at least one layer is made from or contains the polyethylene composition.

In some embodiments, the blown film has a thickness in the range from 8 to 200 μm, alternatively from 10 to 100 μm.

In some embodiments, a 20 μm thick blown film of the polyethylene composition has a DDI of higher than 200 g.

In a general embodiment, various polymerization processes and catalysts can be used to prepare the polyethylene compositions disclosed herein. In some embodiments, the polyethylene composition can be prepared by a gas phase polymerization process in the presence of a Ziegler-Natta catalyst.

In some embodiments, a Ziegler-Natta catalyst is made from or contains a product of the reaction of an organometallic compound of group 1, 2 or 13 of the Periodic Table of elements with a transition metal compound of groups 4 to 10 of the Periodic Table of Elements (new notation). In some embodiments, the transition metal compound can be selected among compounds of Ti, V, Zr, Cr and Hf. In some embodiments, the transition metal compound is supported on MgCl$_2$.

In some embodiments, catalysts are made from or contain the product of the reaction of the organometallic compound of group 1, 2 or 13 of the Periodic Table of elements, with a solid catalyst component made from or containing a Ti compound supported on MgCl$_2$.

In some embodiments, the organometallic compounds are organo-Al compounds.

In some embodiments, the polyethylene composition is obtainable by using a Ziegler-Natta polymerization catalyst, alternatively a Ziegler-Natta catalyst supported on MgCl$_2$, alternatively a Ziegler-Natta catalyst made from or containing the product of reaction of:

a) a solid catalyst component made from or containing a Ti compound and optionally an electron donor compound ED supported on MgCl$_2$;

b) an organo-Al compound; and optionally c) an external electron donor compound ED$_{ext}$.

In some embodiments, the titanium compounds are the tetrahalides or the compounds of formula TiX$_n$(OR$^1$)$_{4-n}$, where 0≤n≤3, X is halogen and R$^1$ is C$_1$-C$_{10}$ hydrocarbon group. In some embodiments, the halogen is chlorine. In some embodiments, the titanium compound is titanium tetrachloride.

In some embodiments, the ED compound is selected from the group consisting of alcohols, ketones, amines, amides, nitriles, alkoxysilanes, aliphatic ethers, and esters of aliphatic carboxylic acids.

In some embodiments, the ED compound is selected from the group consisting of amides, esters and alkoxysilanes.

In some embodiments, the ED compound is an ester. In some embodiments, the esters are selected from the group consisting of alkyl esters of C1-C20 aliphatic carboxylic acids. In some embodiments, the esters is a C1-C8 alkyl ester of aliphatic mono carboxylic acids such as ethylacetate, methyl formiate, ethylformiate, methylacetate, propylacetate, i-propylacetate, n-butylacetate, i-butylacetate. In some embodiments, the ED compound is an aliphatic ether. In some embodiments, the ED compound is a C2-C20 aliphatic ether, such as tetrahydrofurane (THF) or dioxane.

In some embodiments and in the solid catalyst component, the MgCl$_2$ is the basic support, even if minor amount of additional carriers can be used. In some embodiments, MgCl$_2$ is used as such or obtained from Mg compounds used as precursors that can be transformed into MgCl$_2$ by the reaction with halogenating compounds. In some embodiments, MgCl$_2$ in active form is used.

In some embodiments, the preparation of the polyethylene composition involves the catalysts prepared by first contacting the titanium compound with the MgCl$_2$, or a precursor Mg compound, optionally in the presence of an inert medium, thereby preparing the solid component a) containing a titanium compound supported on MgCl$_2$, which component a) is optionally contacted with the ED compound which is added to the reaction mixture alone or in a mixture with other compounds in which the ED compound represents the main component, optionally in the presence of an inert medium.

As used herein, the term "main component" means that the ED compound is the main component in terms of molar amount, with respect to the other possible compounds excluded inert solvents or diluents used to handle the contact mixture. The ED treated product can then be subjected to washings with the proper solvents in order to recover the final product. The treatment with the ED compound can be repeated one or more times.

A precursor of MgCl$_2$ can be used as starting Mg compound. In some embodiments, the precursor is selected from compounds having the formula MgR'$_2$ where the R' groups can be independently C1-C20 hydrocarbon groups optionally substituted, OR groups, OCOR groups, chlorine, in which R is a C1-C20 hydrocarbon groups optionally substituted, with the obvious proviso that the R' groups are not simultaneously chlorine. In some embodiments, the precursors are the Lewis adducts between MgCl$_2$ and Lewis bases. In some embodiments, the precursors are MgCl$_2$ (R"OH)$_m$ adducts in which R" groups are C1-C20 hydrocarbon groups, alternatively C1-C10 alkyl groups, and m is from 0.1 to 6, alternatively from 0.5 to 3 and alternatively from 0.5 to 2. In some embodiments, the adducts are obtained by mixing alcohol and MgCl$_2$ in the presence of an inert hydrocarbon immiscible with the adduct, operating under stirring conditions at the melting temperature of the adduct (100-130° C.).

Then, the emulsion is quickly quenched, thereby causing the solidification of the adduct in form of spherical particles. In some embodiments, methods for the preparation of these spherical adducts are as disclosed in U.S. Pat. Nos. 4,469,648 and 4,399,054 and Patent Cooperation Treaty Publication No. WO98/44009. In some embodiments, the method for the spherulization is the spray cooling disclosed in U.S. Pat. Nos. 5,100,849 and 4,829,034.

In some embodiments, the adducts are $MgCl_2 \bullet (EtOH)_m$ adducts in which m is from 0.15 to 1.7 obtained subjecting the adducts with a higher alcohol content to a thermal dealcoholation process carried out in nitrogen flow at temperatures comprised between 50 and 150° C. until the alcohol content is reduced to the above value. In some embodiments, the process for preparing the adduct is disclosed in European Patent No. EP 395083.

The dealcoholation can also be carried out chemically by contacting the adduct with compounds capable to react with the alcohol groups.

In some embodiments, these dealcoholated adducts are characterized by a porosity (measured by mercury method) due to pores with radius up to 0.1 μm ranging from 0.15 to 2.5 cm³/g, alternatively from 0.25 to 1.5 cm³/g.

These adducts are reacted with the $TiX_n(OR^1)_{4-n}$ compound (or mixtures thereof). In some embodiments, the $TiX_n(OR^1)_{4-n}$ compound is titanium tetrachloride. The reaction with the Ti compound can be carried out by suspending the adduct in $TiCl_4$. In some embodiments, the $TiCl_4$ is cold. The mixture is heated up to temperatures ranging from 80–150° C. and kept at this temperature for 0.5-2 hours. The treatment with the titanium compound can be carried out one or more times. In some embodiments, the process is carried out in the presence of an electron donor compound. In some embodiments and at the end of the process, the solid is recovered by separation of the suspension by settling and removing of the liquid, filtration, and centrifugation. In some embodiments, the solid is subjected to washings with solvents. In some embodiments, the washings are carried out with inert hydrocarbon liquids. Alternatively, the washings are carried out with more polar solvents such as halogenated hydrocarbons.

The solid component a) can be brought into contact with the ED compound under conditions able to fix on the solid an effective amount of donor. The amount of donor used can widely vary. In some embodiments, the amount of donor can be used in molar ratio with respect to the Ti content in the intermediate product ranging from 0.5 to 20, alternatively from 1 to 10. In some embodiments, the contact is carried out in a liquid medium such as a liquid hydrocarbon. The temperature at which the contact takes place can vary depending on the nature of the reagents. In some embodiments, the temperature is in the range from −10° to 150° C., alternatively from 0° to 120° C. Temperatures causing the decomposition or degradation of any specific reagents should be avoided even if the temperatures fall within the range. Also, the duration of the treatment can depend on other conditions such as nature of the reagents, temperature, and concentration. In some embodiments, this contact step can last from 10 minutes to 10 hours, alternatively from 0.5 to 5 hours. In some embodiments and to further increase the final donor content, this step is repeated one or more times. In some embodiments and at the end of this step, the solid is recovered by separation of the suspension by settling and removing of the liquid, filtration, and centrifugation. The solid can be subjected to washings with solvents. The washings can be carried out with inert hydrocarbon liquids. Alternatively, the washings can be carried out with more polar solvents such as halogenated or oxygenated hydrocarbons.

The solid catalyst component is converted into catalysts for the polymerization of olefins by reacting the solid catalyst component with an organometallic compound of group 1, 2 or 13 of the Periodic Table of elements. In some embodiments, the organometallic compound is an Al-alkyl compound.

In some embodiments, the alkyl-Al compound is a trialkyl aluminum compounds selected from the group consisting of triethylaluminum, triisobutylaluminum, tri-n-butylaluminum, tri-n-hexyl aluminum, and tri-n-octylaluminum. In some embodiments, the alkyl-Al compound is selected from the group consisting of alkylaluminum halides, alkylaluminum hydrides and alkylaluminum sesquichlorides such as $AlEt_2Cl$ and $Al_2Et_3Cl_3$ optionally in mixture with trialkyl aluminum compounds.

The external electron donor compound $ED_{ext}$ optionally used to prepare the Ziegler-Natta catalysts can be equal to or different from the ED used in the solid catalyst component a). In some embodiments, the external electron donor compound is selected from the group consisting of ethers, esters, amines, ketones, nitriles, silanes and their mixtures. In some embodiments, the external electron donor compound is selected from C2-C20 aliphatic ethers, alternatively cyclic ethers, alternatively cyclic ethers having 3-5 carbon atoms such as tetrahydrofurane and dioxane.

In some embodiments, the catalyst component a) is prepolymerized by producing reduced amounts of polyolefin, alternatively polypropylene or polyethylene.

If the solid component a) is treated with the ED compound, the prepolymerization can be carried out either before or after such treatment.

The amount of prepolymer produced can be up to 500 g per of component a). In some embodiments, the amount of prepolymer is from 0.5 to 20 g per g of solid component a).

In some embodiments, the prepolymerization is carried out with the use of a cocatalyst such as organoaluminum compounds that can also be used in combination with an external electron donor compound.

In some embodiments, the prepolymerization is carried out at temperatures from 0 to 80° C., alternatively from 5 to 70° C., in the liquid or gas phase.

In some embodiments, the polyethylene composition can be prepared in a process including the following steps, in any mutual order:
a) polymerizing ethylene, optionally together with one or more comonomers, in a first gas-phase reactor in the presence of a first amount of hydrogen;
b) copolymerizing ethylene with one or more comonomers in a second gas-phase reactor in the presence of a second amount of hydrogen less than the first amount of hydrogen in step a);
wherein in at least one of the gas-phase reactors the growing polymer particles flow upward through a first polymerization zone (riser) under fast fluidization or transport conditions, leave the riser and enter a second polymerization zone (downcomer) through which the polymer particles flow downward under the action of gravity, leave the downcomer and are reintroduced into the riser, thereby establishing a circulation of polymer between the two polymerization zones.

In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between 0.5 and 15 m/s, alternatively between 0.8 and 5 m/s. See "D. Geldart, Gas Fluidisation Technology, page 155 et seq., J. Wiley & Sons Ltd., 1986".

In the second polymerization zone (downcomer), the polymer particles flow under the action of gravity in a densified form which approach the bulk density of the polymer.

The polymer flows vertically down through the downcomer in a plug flow (packed flow mode), limiting the quantities of gas entrained between the polymer particles.

The step a) an ethylene polymer has a molecular weight lower than the ethylene copolymer obtained from step b).

In some embodiments, a copolymerization of ethylene to produce a relatively low molecular weight ethylene copolymer (step a) is performed upstream the copolymerization of ethylene to produce a relatively high molecular weight ethylene copolymer (step b). In these embodiments and in step a), a gaseous mixture made from or containing ethylene, hydrogen, comonomer and an inert gas is fed to a first gas-phase reactor, alternatively a gas-phase fluidized bed reactor. The polymerization is carried out in the presence of the Ziegler-Natta catalyst.

Hydrogen is fed in an amount depending on the specific catalyst used to obtain in step a) an ethylene polymer with a melt flow index MIE of 30 g/10 min. or higher. To obtain the MIE range, in step a) the hydrogen/ethylene molar ratio is from 1 to 5, the amount of ethylene monomer being from 2 to 20% by volume, alternatively from 5 to 15% by volume, based on the total volume of gas present in the polymerization reactor. The remaining portion of the feeding mixture is represented by inert gases and one or more comonomers, if any. Inert gases are selected from nitrogen or saturated hydrocarbons. In some embodiments, the inert gas is propane.

In some embodiments, the operating temperature in the reactor of step a) is between 50 and 120° C., alternatively between 65 and 100° C., while the operating pressure is between 0.5 and 10 MPa, alternatively between 2.0 and 3.5 MPa.

In some embodiments, the ethylene polymer obtained in step a) represents from 30 to 70% by weight of the total ethylene polymer produced in the overall process, that is, in the first and second serially connected reactors.

The ethylene polymer coming from step a) and the entrained gas are then passed through a solid/gas separation step. The gaseous mixture can be recycled back to the first polymerization reactor while the separated ethylene polymer is fed to the reactor of step b). In some embodiments, the polymer is fed into the second reactor on the connecting part between the downcomer and the riser.

The operating temperature in step b) is in the range of 65 to 95° C., and the pressure is in the range of 1.5 to 4.0 MPa. When broadening of the molecular weight distribution of the final ethylene polymer is sought, the reactor of step b) can be operated by establishing different conditions of monomers and hydrogen concentration within the riser and the downcomer.

In step b) the gas mixture entraining the polymer particles and coming from the riser can be partially or totally prevented from entering the downcomer, thereby obtaining two different gas composition zones. In some embodiments, the different gas composition zones are achieved by feeding a gas or a liquid mixture into the downcomer through a line placed at a point of the downcomer. In some embodiments, the point is in the upper part of the downcomer. In some embodiments, the gas or liquid mixture should have a composition that is different from that of the gas mixture present in the riser. In some embodiments, the flow of the gas or liquid mixture is regulated so that an upward flow of gas counter-current to the flow of the polymer particles is generated and acts as a barrier to the gas mixture entrained among the polymer particles coming from the riser. In some embodiments, the regulation occurs at the top. In some embodiments, the feed has a mixture with low content of hydrogen thereby producing the higher molecular weight polymer fraction in the downcomer. In some embodiments, one or more comonomers is fed to the downcomer of step b), optionally together with ethylene, propane or other inert gases.

The hydrogen/ethylene molar ratio in the downcomer of step b) is between 0.005 and 0.2, the ethylene concentration is from 0.5 to 15%, alternatively from 0.5 to 10%, by volume, the comonomer concentration is from 0.1 to 1.5% by volume, based on the total volume of gas present in the downcomer. The rest is propane or similar inert gases. In some embodiments, a very low molar concentration of hydrogen is present in the downcomer, thereby permitting comonomer to bond to the high molecular weight polyethylene fraction.

The polymer particles coming from the downcomer are reintroduced in the riser of step b).

The polymer particles continue reacting in the absence of additional comonomer being fed to the riser; accordingly, the concentration of comonomer drops to a range of 0.1 to 1.2% by volume, based on the total volume of gas present in the riser. In some embodiments, the comonomer content is controlled to obtain the desired density of the final polyethylene. In the riser of step b) the hydrogen/ethylene molar ratio is in the range of 0.01 to 0.5, the ethylene concentration is between 5 and 20% by volume based on the total volume of gas present in the riser. The rest is propane or other inert gases.

In some embodiments, the polymerization process proceeds as disclosed in Patent Cooperation Treaty Publication No. WO2005019280.

EXAMPLES

These Examples are illustrative and not intended to limit the scope of this disclosure in any manner whatsoever.

The following analytical methods are used to characterize the polymer compositions.

Density

Determined according to ISO 1183 at 23° C.

HMWcopo Index

HMWcopo (High Molecular Weight Copolymer) Index is defined by the following formula:

$$HMWcopo = (\eta_{0.02} \times t_{maxDSC})/(10^5)$$

HMWcopo is a description and quantification of the amount of high molecular weight fraction, correlating to the melt complex viscosity $\eta_{0.02}$ at the frequency of 0.02 rad/s, and the amount of incorporated comonomer which delays the crystallization, as quantified by the maximum heat flow time for quiescent crystallization, $t_{maxDSC}$. The melt viscosity $\eta_{0.02}$ is determined by a measurement in dynamic oscillatory shear in a parallel plate rotational rheometer (in this case an AntonPaar MCR300), with 25 mm diameter plates, at T=190° C. Samples were prepared in a melt-press at 200° C., under 200 bar pressure for 4 min, in a plate of thickness of approximately 1 mm and stamped out to 25 mm diameter discs, which were inserted in the rheometer. The measurement was done in dynamic oscillatory shear mode as a "frequency-sweep", measuring at frequencies from 620 to 0.02 rad/s, under constant strain-amplitude of 5% (in the linear rheological regime). The $t_{maxDSC}$ was determined using a Differential Scanning calorimetry apparatus, TA Instruments Q2000, under isothermal conditions at a constant temperature of 124° C. 5-6 mg of sample were weighed and brought into the aluminum DSC pans. The sample was heated with 20K/min up to 200° C. and cooled down also with 20K/min to the test temperature, thereby erasing the thermal history. The isothermal test began immediately after and the time was recorded until crystallization occurs. The time interval until the crystallization heat flow maximum (peak), $t_{maxDSC}$, was determined using the vendor software (TA Instruments). The measurement was repeated 3 times and an average value was then calculated (in min). If no crystallization was observed under these conditions for more than 120 minutes, the value of $t_{maxDSC}$=120 minutes was used for further calculations of the HMWcopo index.

The melt viscosity $\eta_{0.02}$ value was multiplied by the $t_{maxDSC}$ value and the product was normalized by a factor of 100000 (10^5).

Molecular Weight Distribution Determination

The determination of the molar mass distributions and the mean number average mol. weight Mn was carried out by high-temperature gel permeation chromatography using a method described in ISO 16014-1, -2, -4, issues of 2003. The weight-average mol. weight $M_w$ and the z-average Mz, as well as the $M_w/M_n$ derived where determined by the MALLS coupled to the GPC. Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used. The solvent was vacuum distilled under nitrogen and stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation were carried out using NTGPC_Control_V6.02.03 and NTGPC_V6.4.24 (hs GmbH, Hauptstraße 36, D-55437 Ober-Hilbersheim, Germany) respectively.

Melt Flow Index

Determined according to ISO 1133 at 190° C. with the specified load.

Long Chain Branching index (LCBI)

The LCBI corresponds to the branching factor g', measured for a molecular weight of $10^6$ g/mol. The branching factor g', which allows determining long-chain branches at high Mw, was measured by Gel Permeation Chromatography (GPC) coupled with Multi-Angle Laser-Light Scattering (MALLS). The radius of gyration for each fraction eluted from the GPC (with a flow-rate of 0.6 ml/min and a column packed with 30 µm particles) was measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software.

The parameter g' is the ratio of the measured mean square radius of gyration to that of a linear polymer having the same molecular weight. Linear molecules show g' of 1 while values less than 1 indicate the presence of LCB. Values of g' as a function of mol. weight, M, were calculated from the equation:

$$g'(M) = \langle Rg^2 \rangle_{sample,M} / \langle Rg^2 \rangle_{linear\ ref,M}$$

where $\langle Rg^2 \rangle$, M is the root-mean-square radius of gyration for the fraction of mol. weight M.

The radius of gyration for each fraction eluted from the GPC (with a flow-rate of 0.6 ml/min and a column packed with 30 µm particles) was measured by analyzing the light scattering at the different angles. Mol. weight M and $\langle Rg^2 \rangle_{sample,M}$ were determined and g' was defined at a measured M=$10^6$ g/mol. The $\langle Rg^2 \rangle_{linear\ ref,M}$ was calculated by the established relation between radius-of-gyration and molecular weight for a linear polymer in solution (Zimm and Stockmayer WH 1949)) and confirmed by measuring a linear PE reference.

The protocol is described in the following documents.

Zimm B H, Stockmayer WH (1949) *The dimensions of chain molecules containing branches and rings*. J Chem Phys 17 and Rubinstein M., Colby R H. (2003), *Polymer Physics*, Oxford University Press Comonomer Content The comonomer content was determined by IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result agreed with the estimated comonomer content derived from the mass-balance of the polymerization process.

Dart Drop Index (DDI)

Determined according to ASTM D1709, method A, on a film having thickness of 20 µm or 10 µm.

Bubble Stability

Blown films were produced on an Alpine film blowing plant including an extruder with a diameter $D_1$ of 50 mm and a length of $21D_1$ (=1.05 m) and an annular die having a diameter $D_2$ of 120 mm and a gap width of 1 mm. The films were produced at increasing take-off speeds.

Blow-up ratio was of 4:1 and the stalk length of 90 cm.

The melt temperature of the polyethylene composition in the extruder was 225-230° C.

In a preliminary test, the take-off speed was set at predetermined increasing take-off speeds, namely at 35, 58, 63, 70, 77 and 87 m/min (=maximum rolling-up speed). After the respective take-off speed was attained and the neck length had been adjusted to 90 cm by adjusting the cooling air blower, the axial oscillation of the film bubble was observed.

The test was considered finished and passed at a given speed if the axial oscillation of the bubble being formed was in the range of ±2 cm over a period of observation of one (1) minute.

The shock test was subsequently carried out at the same take-off speed setting as in the preliminary test. In the shock test, the bubble was made axially oscillate, by fully opening the iris of the cooling air blower for a period of about 7 s.

The iris was then reset to the initial position. The opening and closing of the iris was monitored by the pressure of the cooling air. At temperatures greater than 25° C., the iris was opened and then shut completely for a maximum of 3 s, after which the iris was reset to the initial position, always monitoring by air pressure. The shock test was considered passed at a given take-off speed if the oscillations of the film bubble had abated to ±2 cm within 2 minutes.

If the shock test or the preliminary test was not passed at a particular take-off speed, the stability grade corresponding to the previous lower take-off speed was awarded.

The below ranking was used to award the stability grade.

| Take-off speed [m/min.] | Stability grade |
|---|---|
| 87 (8 μm) | 1 |
| 77 (9 μm) | 2 |
| 70 (10 μm) | 3 |
| 63 (11 μm) | 4 |
| 58 (12 μm) | 5 |
| 35 (20 μm) | 6 |

Process Setup

The polymerization process was carried out under continuous conditions in a plant including two serially connected gas-phase reactors, as shown in FIG. 1.

The polymerization catalyst was prepared as follows.

A magnesium chloride and alcohol adduct containing about 3 mols of alcohol was prepared following the method described in example 2 of U.S. Pat. No. 4,399,054, but working at 2000 RPM instead of 10000 RPM. The adduct was subjected to a thermal treatment, under nitrogen stream, over a temperature range of 50–150° C. until a weight content of 25% of alcohol is reached. Into a 2 L four-necked round flask, purged with nitrogen, 1 L of $TiCl_4$ was introduced at about 0° C. Then, at about the same temperature, 70 g of a spherical $MgCl_2$/EtOH adduct containing 25% wt of ethanol were added under stirring. The temperature was raised to about 140° C. in about 2 h and maintained for about 60 min. Then, the stirring was discontinued, the solid product was allowed to settle and the supernatant liquid was siphoned off.

The solid residue was then washed once with heptane at 80° C. and five times with hexane at 25° C. and dried under vacuum at 30° C.

Solid catalyst component was prepared according to the synthetic route and then prepolymerized with propylene in amount of 1 g polypropylene/g of catalyst component, in accordance with the method described in Example 7 of Patent Cooperation Treaty Publication No. WO01/85803.

Example 1

9 g/h of the solid catalyst were fed, using 5 kg/h of liquid propane, to a precontacting apparatus, in which triisobutylaluminum (TIBA) was dosed. The weight ratio between aluminum alkyl and solid catalyst component was 2:1. The precontacting step was carried out under stirring at 40° C. with a total residence time of 60 minutes.

The catalyst entered the first gas-phase polymerization reactor 1 of FIG. 1 via line 10. In the first reactor ethylene was polymerized using $H_2$ as molecular weight regulator and in the presence of propane as inert diluent. 48 kg/h of ethylene and 160 g/h of hydrogen were fed to the first reactor via line 9. No comonomer was fed to the first reactor.

The polymerization was carried out at a temperature of 80° C. and at a pressure of 2.9 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 40 g/10 min and a density of 0.966 kg/dm³.

The second reactor was operated under polymerization conditions of about 82° C., and a pressure of 2.5 MPa. The riser had an internal diameter of 200 mm and a length of 19 m. The downcomer had a total length of 18 m, an upper part of 5 m with an internal diameter of 300 mm and a lower part of 13 m with an internal diameter of 150 mm. The second reactor was operated by establishing different conditions of monomers and hydrogen concentration within the riser 32 and the downcomer 33, thereby broadening the molecular weight distribution of the final ethylene polymer and using the conditions of feeding via line 52, 200 kg/h of a liquid stream (liquid barrier) into the upper part of the downcomer 33. The liquid stream had a composition different from that of the gas mixture present in the riser. The different concentrations of monomers and hydrogen within the riser, the downcomer of the second reactor and the composition of the liquid barrier are indicated in Table 1. The liquid stream of line 52 came from the condensation step in the condenser 49, at working conditions of 56° C. and 2.5 MPa, wherein a part of the recycle stream was cooled and partially condensed. As shown in the FIGURE, a separating vessel and a pump were placed, in the order, downstream the condenser 49. The monomers to the downcomer were fed in 3 positions (lines 46). In dosing point 1, located just below the barrier, 10 kg/h of ethylene and 0.70 kg/h of 1-hexene were introduced. In dosing point 2, located 2.3 meters below dosing point 1, 5 kg/h of ethylene were introduced. In dosing point 3, located 4 meters below dosing point 2, 5 kg/h of ethylene were introduced. In each of the 3 dosing points, a liquid taken from stream 52 was additionally fed in ratio to ethylene of 1:1. 5 kg/h of propane, 30.3 kg/h of ethylene and 11 g/h of hydrogen were fed through line 45 into the recycling system.

The final polymer was discontinuously discharged via line 54.

The polymerization process in the second reactor produced relatively high molecular weight polyethylene fractions. In Table 1 the properties of the final product are specified.

The first reactor produced around 48% by weight (split wt %) of the total amount of the final polyethylene resin produced by both first and second reactors.

The comonomer (hexene-1) amount was of about 0.7% by weight (as determined by IR).

Example 2

The conditions were the same as compared to example 1 except for a feeding of THF (tetrahydrofuran) to the precontacting apparatus. The ratio between TIBA and THF was 300 g/g.

Example 3

The conditions were the same as compared to example 1 except for a feeding of THF (tetrahydrofuran) to the precontacting apparatus. The ratio between TIBA and THF was 150 g/g.

Comparative Example 1

The polymer was a polyethylene composition available on the market with the commercial name HIZEX 7000F (Prime Polymer Co.).

TABLE 1

|  | Ex. 1 | Ex. 2 | Ex. 3 | Comp. 1 |
|---|---|---|---|---|
| Operative conditions first reactor | | | | |
| $H_2/C_2H_4$ Molar ratio | 2.4 | 2.3 | 2.5 | — |
| $C_2H_4$ % | 7.7 | 8.3 | 8.1 | — |
| Split (wt %) | 48 | 48 | 48 | — |
| MIE A) | 42 | 44 | 40 | — |
| Operative conditions second reactor | | | | |
| $H_2/C_2H_4$ Molar ratio riser | 0.13 | 0.14 | 0.13 | — |
| $C_2H_4$ % riser | 9 | 13.1 | 15.1 | — |
| $C_6H_{12}$ % riser | 0.18 | 0.3 | 0.35 | — |
| $H_2/C_2H_4$ Molar ratio downcomer | 0.085 | 0.07 | 0.074 | — |
| $C_2H_4$ % downcomer | 2.6 | 5.4 | 7 | — |
| $C_6H_{12}$ % downcomer | 0.21 | 0.34 | 0.45 | — |
| $H_2/C_2H_4$ Molar ratio barrier | 0.024 | 0.025 | 0.024 | — |
| $C_2H_4$ % barrier | 5.5 | 8 | 9.7 | — |
| $C_6H_{12}$ % barrier | 0.24 | 0.38 | 0.51 | — |
| Polymer properties | | | | |
| Density (A) [g/cm³] | 0.966 | 0.967 | 0.966 | — |
| MIP final resin [g/10 min.] | 0.19 | 0.24 | 0.2 | 0.21 |
| MIF final resin [g/10 min.] | 6.7 | 7.4 | 5.7 | 8 |
| Density final resin [g/cm³] | 0.953 | 0.953 | 0.952 | 0.953 |
| MIF/MIP final resin | 35.3 | 30.7 | 28.6 | 38.1 |
| $Mw_{MALLS}/Mn_{GPC}$ | 28.9 | 37.5 | 20.8 | 48.0 |
| $Mw_{MALLS}$ [g/mol] | 568641 | 442889 | 432518 | 508244 |
| $Mz_{MALLS}$ [g/mol] | 3393124 | 2468181 | 1716861 | 2689956 |
| LCBI at 1,000,000 g/mol | 0.50 | 0.58 | 0.68 | 0.57 |
| HMWcopo | 7.4 | 4.3 | 7.0 | 463.1 |
| DDI 20 µm/10 µm [g] | 240/170 | 261/265 | 340/270 | ~430/~380 |
| Bubble stability | 1 | 1 | 1 | ~4-6 |

Notes:
$C_2H_4$ = ethylene;
$C_6H_{12}$ = hexene;
ethylene and hexene amounts are in percent by moles;
Split = weight amount of polymer produced in the concerned reactor.

What is claimed is:

1. A polyethylene composition comprising:
  A) from 30 to 70% by weight of the polyethylene composition is an ethylene polymer, wherein the polymer is an ethylene homopolymer or a copolymer, and wherein the ethylene polymer has a density equal to or greater than 0.960 g/cm³, and a melt flow index MIE at 190° C. with a load of 2.16 kg, according to ISO 1133, greater than 35 g/10 min.;
  B) from 30 to 70% by weight of the polyethylene composition is a second ethylene copolymer, wherein the second ethylene copolymer has a MIE value lower than the MIE value of A)
  wherein the polyethylene composition has a molecular weight and
    1) a density from 0.945 to 0.958 g/cm³, determined according to ISO 1183 at 23° C.;
    2) an MIF/MIP ratio from 20 to 43, where MIF is the melt flow index at 190° C. with a load of 21.60 kg, and MIP is the melt flow index at 190° C. with a load of 5 kg, both determined according to ISO 1133;
    3) an MIF from 4.0 to less than 8.5 g/10 min.;
    4) an HMWcopo index from 3.5 to 20;
    5) a long-chain branching index, LCBI, equal to or lower than 0.82;
  wherein the HMWcopo index is determined according to the following formula:

$$\text{HMWcopo} = (\eta_{0.02} \times t_{maxDSC})/(10^5)$$

where
    (i) $\eta_{0.02}$ is the complex viscosity of a melt in Pa·s, measured at a temperature of 190° C., in a parallel-plate rheometer under dynamic oscillatory shear mode with an applied angular frequency of 0.02 rad/s;
    (ii) $t_{maxDSC}$ is the time in minutes to reach the maximum value of heat flow of crystallization at a temperature of 124° C. under quiescent conditions, measured in isothermal mode in a differential scanning calorimetry apparatus; and
    (iii) LCBI is the ratio of the measured mean-square radius of gyration $R_g$, measured by GPC-MALLS, to the mean-square radius of gyration for a linear PE having a molecular weight, equal to the molecular weight of the polyethylene composition.

2. The polyethylene composition of claim 1, wherein the ethylene polymer is an ethylene copolymer.

3. The polyethylene composition of claim 1, wherein the ethylene polymer was prepared in the presence of a Ziegler-Natta polymerization catalyst.

4. The polyethylene composition of claim 3, wherein the Ziegler-Natta polymerization catalyst comprises a product of a reaction of:
  a) a prepolymerized solid catalyst component comprising a Ti compound supported on $MgCl_2$;
  b) an organo-Al compound; and optionally
  c) an external electron donor compound.

5. The polyethylene composition of claim 1, wherein the polyethylene composition comprises
  A) from 40 to 60% by weight of the polyethylene composition is the ethylene polymer, wherein the ethylene polymer has a melt flow index MIE at 190° C. with a load of 2.16 kg, according to ISO 1133, from greater than 35 to 100 g/10 min.;
  B) from 40 to 60% by weight of the polyethylene composition is the second ethylene copolymer, wherein the second ethylene copolymer has a melt flow index MIE at 190° C. with a load of 2.16 kg, according to ISO 1133, lower than 0.5 g/10 min.

6. The polyethylene composition of claim 1, wherein the polyethylene composition has at least one of the following additional features:
  a) a z-average molecular weight Mz equal to or greater than 1,200,000 g/mol, measured by GPC-MALLS;
  b) an $M_{w\_MALLS}/M_{n\_GPC}$ value from 15 to 40; and
  c) a comonomer content equal to or less than 2.5% by weight, with respect to the total weight of the composition (as determined by IR).

7. The polyolefin composition of claim 1, wherein the long-chain branching index, LCBI, is 0.45 to 0.68.

8. An article of manufacture comprising:
  (a) a polyethylene composition comprising:
  A) from 30 to 70% by weight of the polyethylene composition is an ethylene polymer, wherein the polymer is an ethylene homopolymer or a copolymer, and wherein the ethylene polymer has a density equal to or greater than 0.960 g/cm³, and a melt flow index MIE at 190° C. with a load of 2.16 kg, according to ISO 1133, greater than 35 g/10 min.;

B) from 30 to 70% by weight of the polyethylene composition is a second ethylene copolymer, wherein the second ethylene copolymer has a MIE value lower than the MIE value of A)

wherein the polyethylene composition has a molecular weight and a density from 0.945 to 0.958 g/cm$^3$, determined according to ISO 1183 at 23° C.;

an MIF/MIP ratio from 20 to 43, where MIF is the melt flow index at 190° C. with a load of 21.60 kg, and MIP is the melt flow index at 190° C. with a load of 5 kg, both determined according to ISO 1133;

an MIF from 4.0 to less than 8.5 g/10 min.;

an HMWcopo index from 3.5 to 20;

a long-chain branching index, LCBI, equal to or lower than 0.82;

wherein the HMWcopo index is determined according to the following formula:

HMWcopo=$(\eta_{0.02} \times t_{maxDSC})/(10^5)$ where (i) $\eta_{0.02}$ is the complex viscosity of a melt in Pa·s, measured at a temperature of 190° C., in a parallel-plate rheometer under dynamic oscillatory shear mode with an applied angular frequency of 0.02 rad/s;

(ii) $t_{maxDSC}$ is the time in minutes to reach the maximum value of heat flow of crystallization at a temperature of 124° C. under quiescent conditions, measured in isothermal mode in a differential scanning calorimetry apparatus; and (iii) LCBI is the ratio of the measured mean-square radius of gyration $R_g$, measured by GPC-MALLS, to the mean-square radius of gyration for a linear PE having a molecular weight, equal to the molecular weight of the polyethylene composition.

9. The article of manufacture according to claim 8, being a mono- or multilayer blown film, wherein at least one layer comprises the polyethylene composition.

10. The article of manufacture of claim 8, wherein the long-chain branching index, LCBI, is 0.45 to 0.68.

11. A process for preparing a polyethylene composition comprising:

polymerization steps carried out in the presence of a Ziegler-Natta polymerization catalyst supported on MgCl$_2$, wherein the polyethylene composition comprises:

A) from 30 to 70% by weight of the polyethylene composition is an ethylene polymer, wherein the polymer is an ethylene homopolymer or a copolymer, and wherein the ethylene polymer has a density equal to or greater than 0.960 g/cm$^3$, and a melt flow index MIE at 190° C. with a load of 2.16 kg, according to ISO 1133, greater than 35 g/10 min.;

B) from 30 to 70% by weight of the polyethylene composition is a second ethylene copolymer, wherein the second ethylene copolymer has a MIE value lower than the MIE value of A)

wherein the polyethylene composition has a molecular weight and 1) a density from 0.945 to 0.958 g/cm$^3$, determined according to ISO 1183 at 23° C.;

2) an MIF/MIP ratio from 20 to 43, where MIF is the melt flow index at 190° C. with a load of 21.60 kg, and MIP is the melt flow index at 190° C. with a load of 5 kg, both determined according to ISO 1133;

3) an MIF from 4.0 to less than 8.5 g/10 min.;

4) an HMWcopo index from 3.5 to 20;

5) a long-chain branching index, LCBI, equal to or lower than 0.82;

wherein the HMWcopo index is determined according to the following formula:

HMWcopo=$(\eta_{0.02} \times t_{maxDSC})/(10^5)$ where (i) $\eta_{0.02}$ is the complex viscosity of a melt in Pa·s, measured at a temperature of 190° C., in a parallel-plate rheometer under dynamic oscillatory shear mode with an applied angular frequency of 0.02 rad/s;

(ii) $t_{maxDSC}$ is the time in minutes to reach the maximum value of heat flow of crystallization at a temperature of 124° C. under quiescent conditions, measured in isothermal mode in a differential scanning calorimetry apparatus; and (iii) LCBI is the ratio of the measured mean-square radius of gyration $R_g$, measured by GPC-MALLS, to the mean-square radius of gyration for a linear PE having a molecular weight, equal to the molecular weight of the polyethylene composition.

12. The process of claim 11, wherein the polymerization steps include the following steps, in any mutual order:

a) polymerizing ethylene, optionally together with one or more comonomers, in a first gas-phase reactor in the presence of a first amount of hydrogen; and b) copolymerizing ethylene with one or more comonomers in a second gas-phase reactor in the presence of a second amount of hydrogen less than the first amount of hydrogen in step a);

wherein in at least one of the gas-phase reactors, the growing polymer particles flow upward through a first polymerization zone under fast fluidization or transport conditions, leave the riser and enter a second polymerization zone through which the polymer particles flow downward under the action of gravity, leave the second polymerization zone and are reintroduced into the first polymerization zone, thereby establishing a circulation of polymer between the two polymerization zones.

13. The process of claim 11, wherein the long-chain branching index, LCBI, is 0.45 to 0.68.

* * * * *